United States Patent [19]

Motohashi et al.

[11] Patent Number: 5,214,850
[45] Date of Patent: Jun. 1, 1993

[54] METHOD OF MAKING A CAGE FOR USE IN A ROLLER BEARING

[75] Inventors: Nobutsuna Motohashi; Yoshinori Tsuboi, both of Osaka; Shiro Masuda, Tochigi, all of Japan

[73] Assignees: Koyo Seiko Co., Ltd., Osaka; Utsunomiya Kiki Co., Ltd., Tochigi, both of Japan

[21] Appl. No.: 798,831

[22] Filed: Nov. 25, 1991

Related U.S. Application Data

[62] Division of Ser. No. 625,041, Dec. 10, 1990, Pat. No. 5,096,311.

Foreign Application Priority Data

[30]
Dec. 11, 1989 [JP] Japan .............................. 1-143383[U]

[51] Int. Cl.$^5$ .............................................. F16C 33/00
[52] U.S. Cl. .................................. 29/898.067; 29/558; 29/DIG. 19; 51/290
[58] Field of Search .................... 29/557, 558, 898.067, 29/DIG. 19; 51/289 R, 290, 291, DIG. 2; 384/572, 573, 579, 580, 470

[56] References Cited

U.S. PATENT DOCUMENTS

| | | | |
|---|---|---|---|
| 2,053,534 | 9/1936 | Robinson | 29/898.067 X |
| 3,124,867 | 3/1964 | Schick | 29/898.067 |
| 3,707,753 | 1/1973 | Bailey, Jr. | 29/898.067 |
| 4,689,982 | 9/1987 | Olschewski et al. | 29/898.067 X |
| 4,978,237 | 12/1990 | Motohashi et al. | 29/898.067 X |

OTHER PUBLICATIONS

"Marks Standard Handbook for Mechanical Engineers", Eighth edition, 1978, McGraw-Hill, pp. 13-70.

Primary Examiner—Mark Rosenbaum
Assistant Examiner—S. Thomas Hughes
Attorney, Agent, or Firm—Mason, Fenwick & Lawrence

[57] ABSTRACT

A method of making a cage for use in a roller bearing comprises the steps of forming an inner circumferential groove centrally in an annular-shaped workpiece made of metal to define a circumferentially-extending side ring section on either side of the groove, punching the workpiece to form a plurality of axially-extending, circumferentially spaced-apart pockets for receiving rollers, and roughly abrading the outer peripheral surface of the workpiece. The punching and abrading steps inherently cause the outer peripheral surface of the workpiece at the side ring sections to become wavy, with a plurality of alternating recessed and raised portions. As a result of the abrading step, the difference in depth between the tops of the raised portions and the recessed portions is in the range of between approximately 60 μm to 70 μm. Accordingly, the outer peripheral surface of the workpiece is super finished to provide the tops of the raised portions with a cylindrical surface with a constant radius of curvature, while preserving the recessed portions. The workpiece is then split into two halves, following the super finishing step. As a result of the super finishing step, the difference in depth between the cylindrical surface and the recessed portions is in the range of between approximately 5 μm to 50 μm.

4 Claims, 5 Drawing Sheets

METHOD OF MAKING A CAGE FOR USE IN A ROLLER BEARING

CROSS REFERENCE TO RELATED APPLICATION

This application is a division of application Ser. No. 07/625,041, filed Dec. 10, 1990, now U.S. Pat. No. 5,096,311.

BACKGROUND OF THE INVENTION

The present invention relates to a cage for use in a roller bearing disposed, for example, on a crankpin of a crankshaft in an internal combustion engine and a method of making the same.

A roller bearing is typically disposed between a connecting rod and a crankpin of a crankshaft in an internal combustion engine. Such a roller bearing includes a cage and rollers retained the cage, but with no bearing rings. A cage for use in this type of roller bearing is made of metal since the ambient temperature is between 150° and 160°.

The cage is disclosed, for example, in Japanese laid-open patent publication No. Sho 61-266827 (Prior art). Reference will briefly be made to FIGS. 5 and 6 showing an embodiment of the present invention. The construction disclosed in FIGS. 5, 6 and 7 is common to the prior art.

In the drawing figures, 1 is a cage for use in a roller bearing. 2 are rollers. 3 are pockets in which the rollers 2 are received, extending axially and spaced apart from one another circumferentially. 4 is an inner circumferential groove formed axially centrally of the cage 1 and having a predetermined width. 5 are partitions (stays) each provided between two adjacent pockets 3. Due to the formation of the inner circumferential groove 4, a central portion of each partition 5 in the axial direction of the cage is thinner than its remainder. Such a thin portion is designated by the reference numeral 6. Thick portions (side stays) are formed at opposite sides of the thin portion 6 and designated by the reference numeral 7.

Two outer projections 8 extend slightly from the outer surface of the thin portions 6 into the pocket 3. The distance between the two confronting outer projections 8 is less than the maximum diameter of the roller 2 so as to prevent the roller 2 from moving radially outwardly out of the pocket 3. Two grooves 9 are formed in the inner surface of the thick portions 7 and extend circumferentially of the cage. At open ends of the grooves 9, two inner projections 10 extend slightly from the inner surface the thick portions 7 into the pocket 3, respectively. Within the pocket 3, the distance between the confronting inner projections 10 is less than the maximum diameter of the roller 2 so as to prevent the roller 2 from moving radially inwardly out of the pocket 3. The groove 9 is formed by knurling, and the inner projections 10 are formed as a result of plastic deformation in the process of such a knurling.

Each roller 2 is confined within the pocket 3 so as not to move radially inwardly and outwardly out of the pocket 3, but can be moved to a predetermined extent in both radial and circumferential directions. In use, the roller 2 is guided along the sides of the thick portions 7 of the cage 1.

Reference will briefly be made to a method of making the cage of this type.

Typically, a cylindrical pipe is, first, cut to a predetermined length. The piece thus cut is, then, recessed to provide an inner circumferential groove 4 (inner circumferential forming step). Thereafter, a suitable punch A is used to form several pockets 3 in the piece 3 (pocket forming step). The outer periphery of the piece is roughly abraded (rough abrasion step).

A portion of the cage 1 which surrounds the pocket 3 as shown particularly by a dot-dash-line in FIG. 7 is recessed due to pressure when the piece is punched in the pocket forming step. Thereafter, when such a portion is roughly and randomly abraded in a direction circumferentially of the cage, such a shear drop becomes more serious. Particularly the outer peripheral edges of the cage 1 at opposite sides of the pocket 3 become wavy or rugged as shown in FIG. 8.

In the event that the cage 1 serves to guide with its outer periphery, the top of each raised portion 11 of the wavy cage 1 is substantially in point contact with the inner peripheral surface of a connecting rod or outer ring. As a result, pressure increases at such a point of contact. Also, it is likely that an oil film formed at the inner peripheral surface of the outer ring is removed. This results in seizing of the components.

To this end, the inventor of the present invention has attempted to super finish the roller cage 1, just like the rollers, so as to substantially completely round the outer surface of the cage 1 and smoothen the rugged or wavy surface of the cage 1. Such a super finish is carried out in a manner shown in FIG. 9. The cage 1 is located between two confronting guide roller B and C. A grinding wheel D is used to apply a predetermined pressure to the outer periphery of the cage 1. While the cage 1 is being rotated by the two guide rollers B and C, the rugged surface of the cage 1 is abraded until the top of the rugged surface is flush with the bottom of a deepest recess 12.

A split-roller bearing is sometimes used between a connecting rod and a crankshaft. Such a split-roller bearing is formed by splitting the cage 1. If the split-cage has no rugged outer peripheral surface as stated earlier, lubricating oil may cause the split-cage to closely contact the inner peripheral surface of the connecting rod. This deteriorates movement of the connecting rod as the cage is rotated therewith. However, if the outer peripheral surface of the cage is not abraded and thus remains rugged, seizing occurs.

In view of the foregoing, it is an object of the present invention to provide a cage for a roller bearing which minimizes pressure between the outer peripheral surface of the cage and the inner peripheral surface of the outer ring so as to prevent seizing thereof, and an particular, to provide a split-cage which prevents the cage from sticking to the inner peripheral surface of the outer ring in order to ensure proper rotation.

It is another object of the present invention to provide a cage for a roller bearing which satisfies various and strict requirements.

SUMMARY OF THE INVENTION

In order to achieve the foregoing objects, according to a first aspect of the present invention, there is provided a cage made of metal for use in a roller bearing, which comprises thin portions formed axially centrally of the cage as a result of formation of an inner circumferential groove, thick portions formed at opposite axial sides of the thin portions, a plurality of pockets in which the rollers are received formed extending axially and spaced apart from one another circumferentially, recessed portions formed in an outer peripheral surface of the thick portions and located at opposite axial sides of the pockets, the recessed portions being included in a rugged portion formed inevitably in a pocket forming step and a rough abrasion step, and a cylindrical surface formed in the outer peripheral surface of each thick portion between the adjacent recessed portions and having a substantially constant radius of curvature.

By this arrangement, the cylindrical surface of the cage is in contact with the inner peripheral surface of the outer ring. Thus, pressure is less developed on the contact surface, and an oil film is no longer removed. While the cage is in contact with the outer ring at several points as earlier stated, gaps are formed between the recessed portions at axial ends of the cage and the inner peripheral surface of the outer ring so as to prevent the cage from closely contacting the outer ring due to gas presented in the gaps and ensure constant rotation. As such, pressure at the surface where the cage is in contact with the outer ring is substantially reduced so as to avoid seizing and provide improved rotation.

The cage is formed in an integral fashion or is of the split type.

When the difference in depth between the recessed portion and the raised portion of the rugged portion formed inevitably as a result of the steps of forming pockets and roughly abrading the workpiece lies approximately in the range of between 60 to 70 $\mu$m, the recessed portion is preferably approximately 5 to 50 $\mu$m deep from the cylindrical surface.

According to a second aspect of the present invention, there is provided a method of making a cage for use in a roller bearing, comprising the steps of forming an inner circumferential groove centrally in a workpiece made of metal, punching the workpiece to form a plurality of pockets, roughly abrading an outer peripheral surface of the workpiece, and super finishing a top of each raised portion in a rugged portion formed at opposite axial ends of the outer peripheral surface of the workpiece so as to make the top to have a cylindrical surface with a constant radius of curvature, the rugged portion being formed inevitably as a result of the steps of forming the pockets and roughly abrading the workpiece.

When the cage is of the split type, there is provided an additional step of splitting the workpiece after the step of super finishing the workpiece.

As stated above, the top of each raised portion in the rugged portion formed at opposite sides of the outer peripheral surface of the cage is super finished to provide a cylindrical surface with a constant radius of curvature, after the workpiece has been roughly abraded. Thus, the roller cage is free of seizing and provides improved rotation.

In the present invention, the steps of forming an inner circumferential groove, forming pockets and roughly abrading the workpiece are carried out in a manner identical to those in the prior art. The step of super finishing the workpiece is carried out in a manner shown in FIG. 9.

BRIEF DESCRIPTION OF THE DRAWINGS

FIG. 1 is a vertical sectional view of a crankshaft with a cage of the present invention;

FIG. 2 is a vertical sectional view of a cage half as split from the cage;

FIG. 3 is a bottom view of the cage half shown in FIG. 2;

FIG. 4 is a view showing the contour of the outer peripheral edge of the cage according to the present invention;

FIG. 5 is a schematic view showing the roller cage according to the present invention;

FIG. 6 is a sectional view taken along the line III—III of FIG. 5;

FIG. 7 is a view showing the manner in which a punch is used to form a pocket;

DETAILED DESCRIPTION OF THE PREFERRED EMBODIMENT

The present invention will now be described by way of example with reference to the drawings.

FIGS. 1 to 7 illustrate one embodiment of the present invention.

Figure 1:
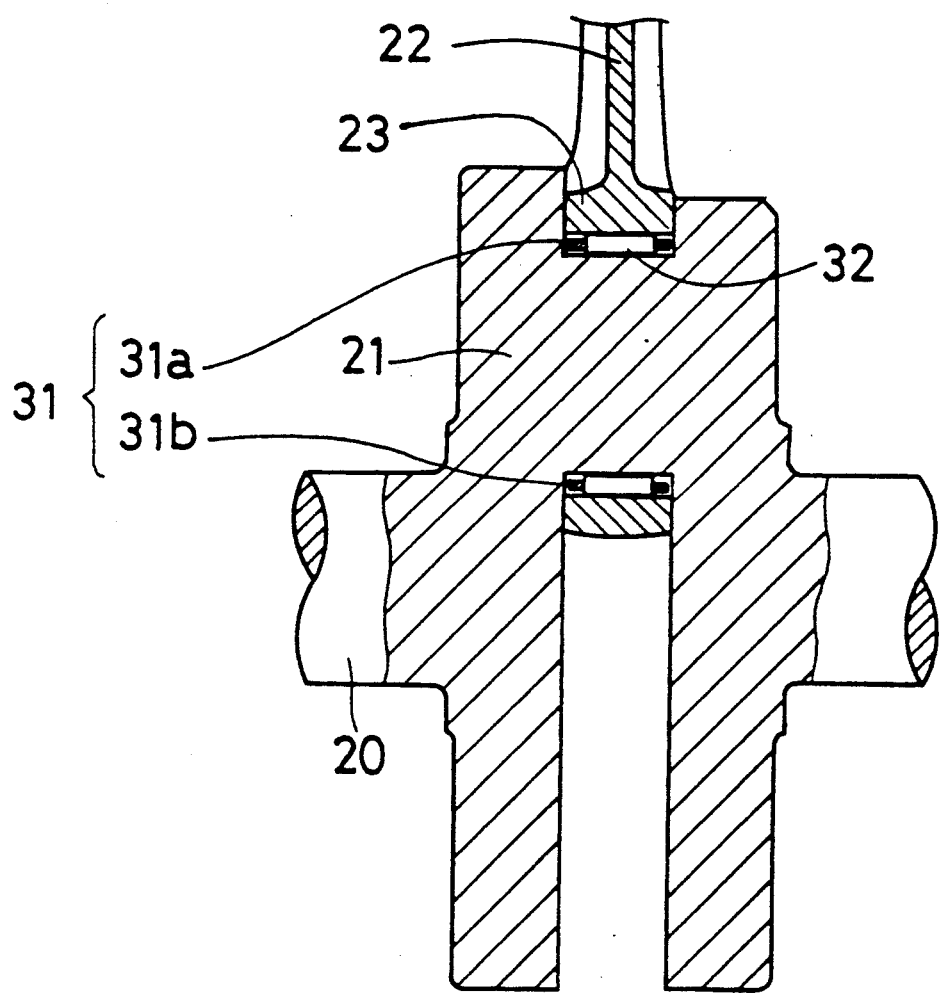
FIGS. 1 to 7 show one embodiment of the present invention.
Figure 2:
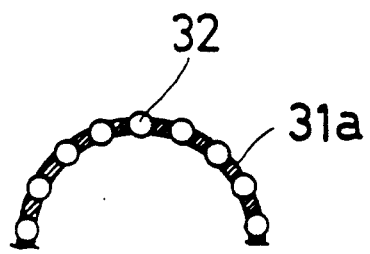
Figure 3:
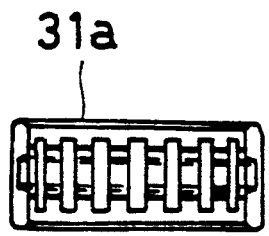

With reference to FIG. 1, there is shown a crankshaft of an engine including a crankpin to which the present invention is applied. 20 is a crankshaft. 21 is a crankpin. A cage 31 of the present invention has a plurality of rollers 32 disposed between the outer periphery of the crankpin 21 and an outer ring 23. The outer ring 23 is comprised of the big end of a connecting rod 22. As shown in FIGS. 2 and 3, the annular cage 31 is split along a line extending between two diametrically opposite points so as to provide two cage halves 31a and 31b. The cage 31 is made, for example, of carburized steel plated with copper and silver. A roller bearing with the cage of the present invention is lubricated by engine oil carried by the crankshaft 20.

Reference will now be made to characterizing features of the present invention.

Figure 4:
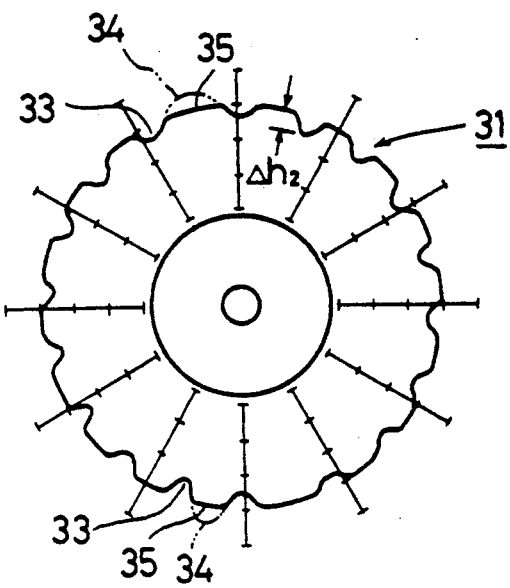
Figure 5:
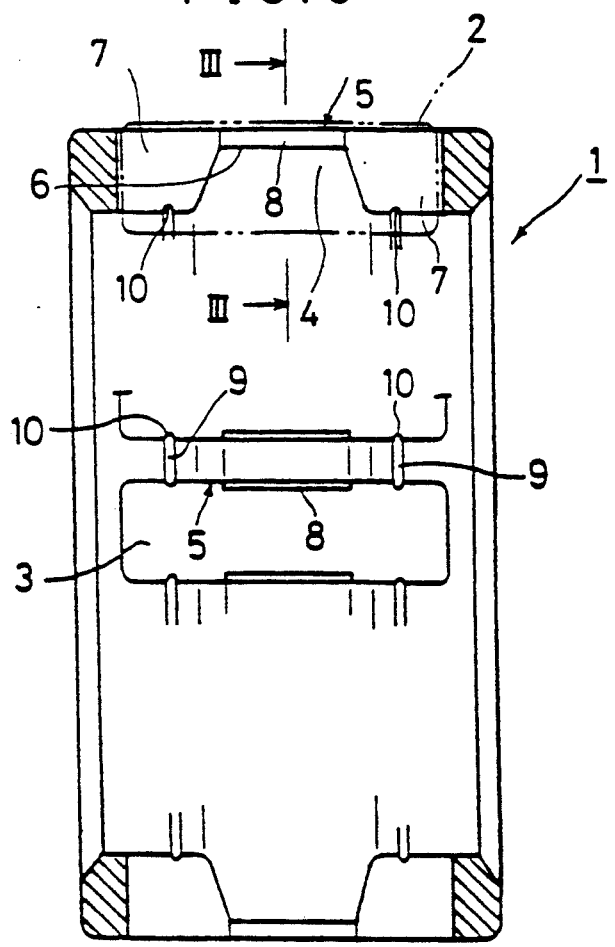
Figure 6:
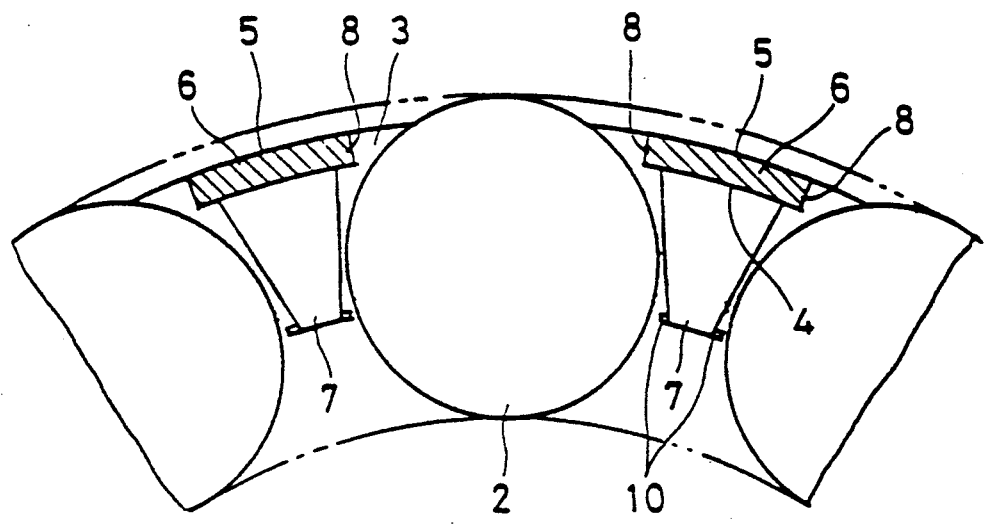
Figure 7:
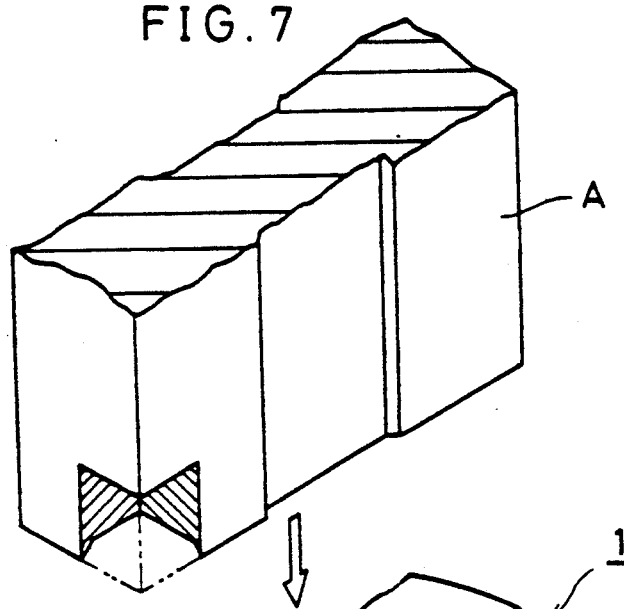
Figure 7:
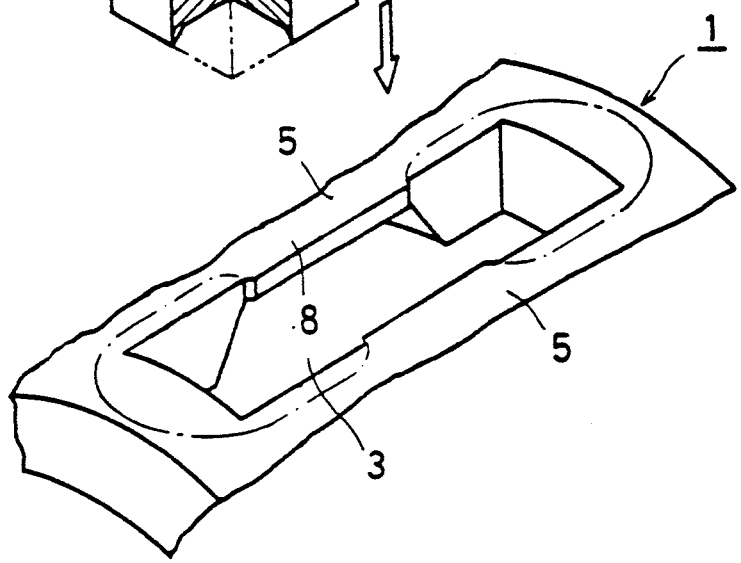

With the cage 1 structures as shown in FIGS. 5 and 6, it is inevitable, as in the prior art, in the prior art that the outer peripheral surface of the cage 1 becomes rugged in the pocket forming step and the rough abrasion step. To this end, the present invention is intended to treat such a rugged surface. As shown in FIG. 4, a plurality of recessed portions 33 are formed in the rugged or wavy surface of the cage. A plurality of raised portions 33 have cylindrical surfaces 35.

Next, reference is made to one method of making the cage 31.

As is conventional, the present invention includes the steps of forming an inner circumferential groove in a cylindrical workpiece, forming pockets in the workpiece, and roughly abrading the outer peripheral surface of the workpiece. Thereafter, the outer peripheral surface of the workpiece is extremely super finished, but to a different extent as compared to the prior art. There is also added a step of splitting the workpiece so as to provide a split-cage.

Figure 8:
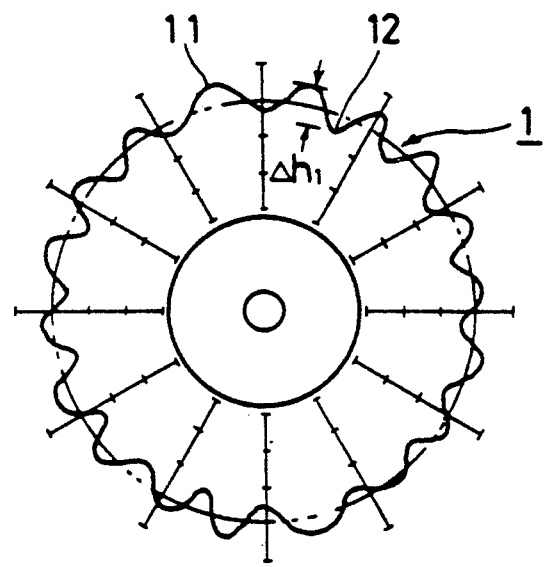
FIG. 8 shows a conventional roller and is a view similar to FIG. 4.
Figure 9:
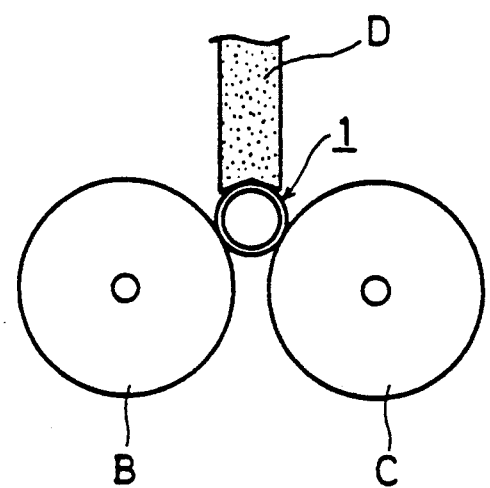
FIG. 9 is a view showing the manner in which the outer peripheral surface of the cage is super finished.

The super finish step is carried out in a manner similar to the one shown in FIG. 9, but the amount of abrasion is limited as will hereinafter be described. The rugged outer surface of the cage 31, arising inevitably from the pocket forming step and the rough abrasion step, is abraded in an effort to make each of the raised portions 34 to have a cylindrical surface, as at 35, with a constant radius of curbature and each of the recessed portions 33 shallow. For example, the rugged outer surface of the cage 31 is abraded to an extent shown by an imaginary line in FIG. 8 so as to provide a surface shown in FIG. 4. The cage 31 thus abraded is then split to provide two halves 31a and 31b.

When the cage 31 is roughly abraded, the difference $\Delta h_1$ in depth between the raised portion 34 and the recessed portion 33 of the rugged outer surface of the cage 31 lies approximately in the range of between 60 and 70 μm. With this in mind, it is preferable that the depth $\Delta h_2$ of the recessed portion 33 lies approximately in the range of between 5 and 50 μm after the cage 31 has been super finished.

With the cage 31 thus surface treated, the cylindrical surface 35 of the cage is in contact with the outer peripheral surface of the outer ring 23 or the connecting rod big end. Thus, pressure is less developed on the surface where the cage 31 is in contact with the outer ring 23. In addition, the amount of which an oil film is removed from the inner peripheral surface of the outer ring 23 is substantially reduced. A gap is formed between the recessed portions 33 and the inner peripheral surface of the outer ring 23 when the cage 31 is in contact with the outer ring 23. This gap prevents the cage 31 from sticking to the inner peripheral surface of the outer ring 23, thus avoiding seizing which may occur as a result of contact between the outer ring 23 and the cage 31 and improper rotation as a result of close contact of the cage 31 with the outer ring 23.

Further, conventionally, when the plurality of pockets are made by press, the partitions (stays) 5 between two of the plurality of pockets are twisted so that the outline shape of the partitions 5 is a rectangular with a projected edge. The projected edge of the rectangular shape remains left even after the rough abrasion step. When the projected edge of the rectangular shape is rotated around in a direction from the projected edge to the un-projected edge, the oil formed at the inner peripheral surface of the outer ring is removed. However, according to the present invention, the outline shape of the partitions 5 between two of the plurality of pockets is rounded by super finish so as to stop removing the oil formed at the inner peripheral surface of the outer ring.

In the above embodiment, a transitional portion between the recessed portion 33 and the cylindrical surface 35 may be rounded.

What is claimed is:

1. A method of making a cage for use in a roller bearing, comprising the steps of:
    forming an inner circumferential groove centrally in an annular-shaped workpiece made of metal and having an outer peripheral surface, to define a circumferentially-extending side ring section on either side of the groove;
    punching the workpiece to form a plurality of axially-extending, circumferentially spaced-apart pockets for receiving rollers;
    roughly abrading the outer peripheral surface of the workpiece, said punching and abrading steps inherently causing the outer peripheral surface of the workpiece at the side ring sections to become wavy, with a plurality of alternating recessed and raised portions, each raised portion having a top; and
    super finishing the outer peripheral surface of the workpiece to provide the tops of the raised portions with a cylindrical surface with a constant radius of curvature, while preserving the recessed portions.

2. The method of claim 1, wherein said abrading step results in a difference in depth between the tops of the raised portions and the recessed portions in the range of between approximately 60 μm to 70 μm, and wherein said super finishing step results in a difference in depth between the cylindrical surface and the recessed portions in the range of between approximately 5 μm to 50 μm.

3. A method of making a cage for use in a roller bearing, comprising the steps of:
    forming an inner circumferential groove centrally in an annular-shaped workpiece made of metal and having an outer peripheral surface, to define a circumferentially-extending side ring section on either side of the groove;
    punching the workpiece to form a plurality of axially-extending, circumferentially spaced-apart pockets for receiving rollers;
    roughly abrading the outer peripheral surface of the workpiece, said punching and abrading steps inherently causing the outer peripheral surface of the workpiece at the side ring sections to become wavy, with a plurality of alternating recessed and raised portions, each raised portion having a top;
    super finishing the outer peripheral surface of the workpiece to provide the tops of the raised portions with a cylindrical surface with a constant radius of curvature, while preserving the recessed portions; and
    splitting the workpiece into two halves, following said super finishing step.

4. The method of claim 3, wherein said abrading step results in a difference in depth between the tops of the raised portions and the recessed portions in the range of between approximately 60 μm to 70 μm, and wherein said super finishing step results in a difference in depth between the cylindrical surface and the recessed portions in the range of between approximately 5 μm to 50 μm.

* * * * *